US011387911B2

(12) United States Patent
Catuogno et al.

(10) Patent No.: US 11,387,911 B2
(45) Date of Patent: Jul. 12, 2022

(54) OPTICAL RECEIVER AND METHOD OF OPERATION (71) Applicant: Telefonaktiebolaget LM Ericsson (publ), Stockholm (SE)

(72) Inventors: Tommaso Catuogno, Pisa (IT); Fabio Cavaliere, Pisa (IT); Luca Poti, Pisa (IT)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 17/260,799

(22) PCT Filed: Jul. 31, 2018

(86) PCT No.: PCT/EP2018/070789
§ 371 (c)(1),
(2) Date: Jan. 15, 2021

(87) PCT Pub. No.: WO2020/025117
PCT Pub. Date: Feb. 6, 2020

(65) Prior Publication Data
US 2021/0281325 A1 Sep. 9, 2021

(51) Int. Cl.
H04B 10/61 (2013.01)
(52) U.S. Cl.
CPC .................... H04B 10/616 (2013.01)
(58) Field of Classification Search
CPC ............ H04B 10/616; H04B 10/611; H04B 10/6162; G06F 11/1443
See application file for complete search history.

(56) References Cited

U.S. PATENT DOCUMENTS 8,401,405 B2 * 3/2013 Barton .............. H04B 10/615
398/212
2010/0266291 A1 * 10/2010 Boffi ............... H04B 10/6161
398/159
(Continued)

FOREIGN PATENT DOCUMENTS

DE 3821438 A1 12/1989
WO 2015079400 A1 6/2015

OTHER PUBLICATIONS

Ciaramella, Ernesto, "Polarization-independent receivers for lowcost coherent OOK systems", IEEE Photonics Technology Letters, vol. 26, No. 6, Mar. 15, 2014, pp. 548-551.
(Continued)

Primary Examiner — Dzung D Tran
(74) Attorney, Agent, or Firm — Murphy, Bilak & Homiller, PLLC (57) ABSTRACT A receiver module (100) is disclosed for receiving an optical input signal and generating an electrical output signal from the optical input signal. The receiver module comprises an input (110) for receiving an optical input signal and a polarising beam splitter (120) for splitting one of the optical input signal and a local recovery optical signal. The receiver module also comprises a multiport optical coupler (130) for coupling the outputs of the polarisation beam splitter and the other of the optical input signal and local recovery optical signal and outputting a plurality of outputs. The receiver module further comprises a first photodetector unit (140) for individually photodetecting the outputs of the multiport optical coupler and an optical modulation unit (150) for using each of the photodetected outputs to modulate a respective local conversion optical signal, where each local conversion optical signal has a different frequency from the other local conversion optical signals. The receiver module also comprises an optical coupler (160) for coupling the
(Continued)

modulated local conversion optical signals to generate an optical output signal and a second photodetector unit (170) for photodetecting the optical output signal to generate an electrical output signal. Also disclosed are a method (500, 700) and a multichannel receiver (300).

20 Claims, 7 Drawing Sheets

(56) References Cited

U.S. PATENT DOCUMENTS

2017/0041080 A1\* 2/2017 Tanaka .................. H04B 10/61
2019/0074908 A1\* 3/2019 Lee ..................... G06F 11/1443

OTHER PUBLICATIONS

Kazovsky, Leonid G., et al., "ASK Multiport Optical Homodyne Receivers", Journal of Lightwave Technology, vol. LT-5, No. 6, 1987, pp. 770-791.

\* cited by examiner

OPTICAL RECEIVER AND METHOD OF OPERATION

TECHNICAL FIELD

The present disclosure relates to a method and a receiver module for receiving an optical input signal and generating an electrical output signal from the optical input signal. The present disclosure also relates a multichannel receiver and method for receiving N optical input signals and generating N output electrical signals from the N input optical signals.

BACKGROUND

Coherent optical transmission techniques employ a local oscillator (LO) at the receiver, the signal from which is mixed with a received optical signal to increase the power of the received signal, effectively amplifying the signal in the optical domain. Amplifying the received signal affords the possibility for the receiver to operate in, or near to, the shot noise regime, and amplitude and phase information of the received signal can be retrieved after photodetection. Conventional modern receivers employing coherent techniques may be employed in metro-core networks, where large distances are present and high capacity is required. For example, coherent transmission systems at 100 Gbit/s, usually based on Dual Polarisation-Quadrature Phase Shift Keying (DP-QPSK) are widespread in long-haul optical networks. In such contexts, coherent techniques are used to enable advanced modulation and coding techniques. Complex digital processing is employed, such as adaptive equalization to compensate for chromatic and polarization mode dispersion, as well as soft-decision forward error correction.

In principle, the use of coherent systems is appealing also for short reach optical communications to increase receiver sensitivity. In addition, in optical systems where no filtering element is present, such as in Passive Optical Network (PON) distribution nodes, coherent systems offer the advantage of being able to select the transmission wavelengths by simply tuning the local oscillator. However, in short reach optical systems it is important to keep cost and power consumption as low as possible by using simple coding schemes and keeping digital signal processing to a minimum. Currently, the cost and power consumption of coherent transmission systems are therefore largely incompatible with the operational constraints for short haul and access networks.

A receiver schematic seeking to avoid the costliest components of a classical coherent receiver is disclosed in Ciaramella, Ernesto: "Polarization-independent receivers for low-cost coherent OOK systems." *IEEE Photonics Technology Letters* 26.6 (2014): 548-551. This receiver schematic avoids the use of a hybrid coupler to mix the received signal with the LO signal, substituting it with a symmetric 3×3 coupler. Two of the input arms of the coupler are injected with the LO signal, which is split into two orthogonal states of polarization by a polarization beam splitter. The last arm of the 3×3 coupler is supplied with an input signal. The outputs of the coupler are detected by three photodiodes and each photocurrent is passed through identical DC-blocks and low-pass filters (LPF), with a bandwidth $B_{pd}$. Finally, the currents are squared and summed by squarer and summer circuitry, to obtain an electrical output signal, which signal is further low-pass filtered by a LPF with bandwidth $B_{rx}$. The disclosed receiver schematic allows for signal detection without costly digital signal processing.

One of the main performance characterizing factors of the above described receiver is the frequency detuning between the LO's frequency and the input signal's frequency, denoted by $\Delta v$. The electrical output signal produced by the receiver comprises two main contributions. One contribution is the correct, polarization independent, baseband signal. The other contribution is a copy of the baseband signal with an amplitude dependent on the state of polarization and translated by a factor $2\Delta v$. In a perfect homodyne scheme ($\Delta v=0$), this additional term has complete spectral overlap with the signal which is consequently unacceptably distorted, meaning no information can be extracted from it.

SUMMARY

It is an aim of the present disclosure to provide a method and apparatus which obviate or reduce at least one or more of the disadvantages mentioned above.

According to a first aspect of the present disclosure, there is provided a receiver module for receiving an optical input signal and generating an electrical output signal from the optical input signal. The receiver module comprises an input for receiving an optical input signal and a polarising beam splitter for splitting one of the optical input signal and a local recovery optical signal. The receiver module also comprises a multiport optical coupler for coupling the outputs of the polarisation beam splitter and the other of the optical input signal and local recovery optical signal and outputting a plurality of outputs.

The receiver module further comprises a first photodetector unit for individually photodetecting the outputs of the multiport optical coupler and an optical modulation unit for using each of the photodetected outputs to modulate a respective local conversion optical signal, wherein each local conversion optical signal has a different frequency from the other local conversion optical signals. The receiver module also comprises an optical coupler for coupling the modulated local conversion optical signals to generate an optical output signal, and a second photodetector unit for photodetecting the optical output signal to generate an electrical output signal.

According to examples of the present disclosure, the second photodetector unit may comprise an output photodetector, and a frequency separation between each of the local conversion optical signals may be greater than a bandwidth of the output photodetector.

According to examples of the present disclosure, a frequency separation between the optical input signal and the local recovery signal may be greater than a threshold value.

According to such examples, the threshold value may be equal to a bandwidth of the optical input signal.

According to examples of the present disclosure, the first photodetector unit may comprise a plurality of photodetecting elements, and each photodetecting element may be arranged to photodetect a respective output from the multiport optical coupler.

According to examples of the present disclosure, the receiver module may further comprise a first electrical processing unit that may be arranged to filter and electrically amplify each of the photodetected outputs from the first photodetector unit.

According to examples of the present disclosure, the receiver module may further comprise a second electrical processing unit that may be arranged to filter the photodetected output of the second photodetector unit.

According to examples of the present disclosure, each of the first and second photodetector units may comprise at least one semiconductor photodetector.

According to examples of the present disclosure, one of the local conversion optical signals may comprise the local recovery optical signal.

According to examples of the present disclosure, the multiport optical coupler may comprise a 3×3 optical coupler.

According to another aspect of the present disclosure, there is provided a multichannel receiver for receiving N optical input signals and generating N electrical output signals from the N optical input signals. The multichannel receiver comprises a receiver module according to any one of the preceding aspect or examples of the present disclosure for each of the N optical input signals. The multichannel receiver also comprises a laser array comprising N lasers for generating a local recovery optical signal of a different frequency for each of the N receiver modules. The multichannel receiver further comprises an optical splitting and distribution architecture for dividing a set of the local recovery optical signals generated by the laser array and distributing the divided optical signals between optical modulation units to provide the local conversion optical signals for all of the receiver modules.

According to examples of the present disclosure, a value of N may be 3 or more.

According to examples of the present disclosure, the optical splitting and distribution architecture may comprise at least three optical splitters, each optical splitter may be arranged to divide a local recovery optical signal generated by a respective laser of the laser array.

According to examples of the present disclosure, components of the receiver module may be arranged in a Photonic Integrated Circuit (PIC) and an Electronic Integrated Circuit (EIC). According to such examples, the PIC and EIC may be arranged on a single chip.

According to another aspect of the present disclosure, there is provided a method for receiving an optical input signal and generating an electrical output signal from the optical input signal. The method comprises splitting one of the optical input signal and a local recovery optical signal in a polarising beam splitter, and directing the outputs of the polarisation beam splitter and the other of the optical input signal and local recovery optical signal through a multiport optical coupler, the multiport optical coupler outputing a plurality of outputs. The method also comprises individually photodetecting outputs of the multiport optical coupler, and using each of the photodetected outputs to modulate a corresponding local conversion optical signal, each local conversion optical signal having a different frequency to the other local conversion optical signals. The method further comprises coupling the modulated local conversion optical signals to generate an optical output signal, and photodetecting the optical output signal to generate the electrical output signal.

According to examples of the present disclosure, photodetecting the optical output signal may comprise directing the optical output signal through a photodetector, and a frequency separation between each of the local conversion optical signals may be greater than a bandwidth of the photodetector.

According to examples of the present disclosure, one of the local conversion optical signals may comprise the local recovery optical signal.

According to examples of the present disclosure, a frequency separation between the optical input signal and the local recovery signal may be greater than a threshold value.

According to such examples, the threshold value may be equal to a bandwidth of the optical input signal.

According to examples of the present disclosure, the method may further comprise electrically filtering and amplifying each of the individually photodetected outputs of the multiport optical coupler.

According to examples of the present disclosure, the method may further comprise electrically filtering the electrical output signal.

According to examples of the present disclosure, the multiport optical coupler may comprise a 3×3 optical coupler.

According to another aspect of the present disclosure, there is provided a method for receiving N optical input signals and generating N output electrical signals from the N input optical signals. The method comprises for each input optical signal, conducting the steps of a method according to any one of the preceding aspect or examples of the present disclosure. The method further comprises generating a local recovery optical signal of a different frequency for each of the N input optical signals, and dividing a set of the generated local recovery optical signals to provide the local conversion optical signals for all of the input optical signals from the generated local recovery optical signals.

According to examples of the present disclosure, a value of N may be 3 or more.

BRIEF DESCRIPTION OF THE DRAWINGS

For a better understanding of the present invention, and to show more clearly how it may be carried into effect, reference will now be made, by way of example, to the following drawings, in which.

DETAILED DESCRIPTION

The receiver schematic discussed above has the disadvantage that when operating in a homodyne scheme, in which a frequency difference, $\Delta v$, between a Local Oscillator (LO) frequency and the input signal's frequency is zero (or negligible), no information can be extracted from the output signal. This is because the output signal comprises main contributions: the correct, polarization independent, baseband signal and a copy of the baseband signal that is translated by a factor $2\Delta v$. In a perfect homodyne scheme this additional term has complete spectral overlap with the signal which is consequently unacceptably distorted. In contrast, in a heterodyne scheme with a non-negligible Δv, the additional term oscillates at 2Δv, meaning the additional translated term can be filtered out to obtain polarization insensitiveness.

If the detuning Δv is large enough, the correct baseband signals can be recovered after the final LPF with a bandwidth of $B_{rx}$. However, the bandwidth $B_{pd}$ of the Low Pass filters (LPFs), which is also the bandwidth required by the summer and squarer circuitry, is proportional to B+Δv, placing an upper limit on the size of Δv. For high speed signals, for example having a bitrate above 10 Gbit/s, this limitation becomes an issue, as it is not currently possible to design commercially viable summer and squarer circuity with a suitable bandwidth to accommodate high speed signals. Accommodating high speed signals of this nature is important in order to use coherent receiver techniques in short reach optical communications. Support of high speed optical signals is also important in 5G transport networks.

Aspects of the present disclosure provide a receiver module and method which may be used for receiving an optical input signal and generating an electrical output signal from the optical input signal. The receiver module and method offer a coherent receiver solution suitable for receiving and accommodating high speed signals. Another aspect of the present disclosure provides a multichannel receiver and method for receiving N optical input signals and generating N output electrical signals from the N input optical signals. The multichannel receiver offers a multichannel coherent receiver suitable for recovering and accommodating multiple high speed signals. The multichannel receiver and method also offer an integrated solution which may provide a coherent receiver capable of recovering high speed signals at a cost compatible with short reach optical communication applications.

Figure 1:
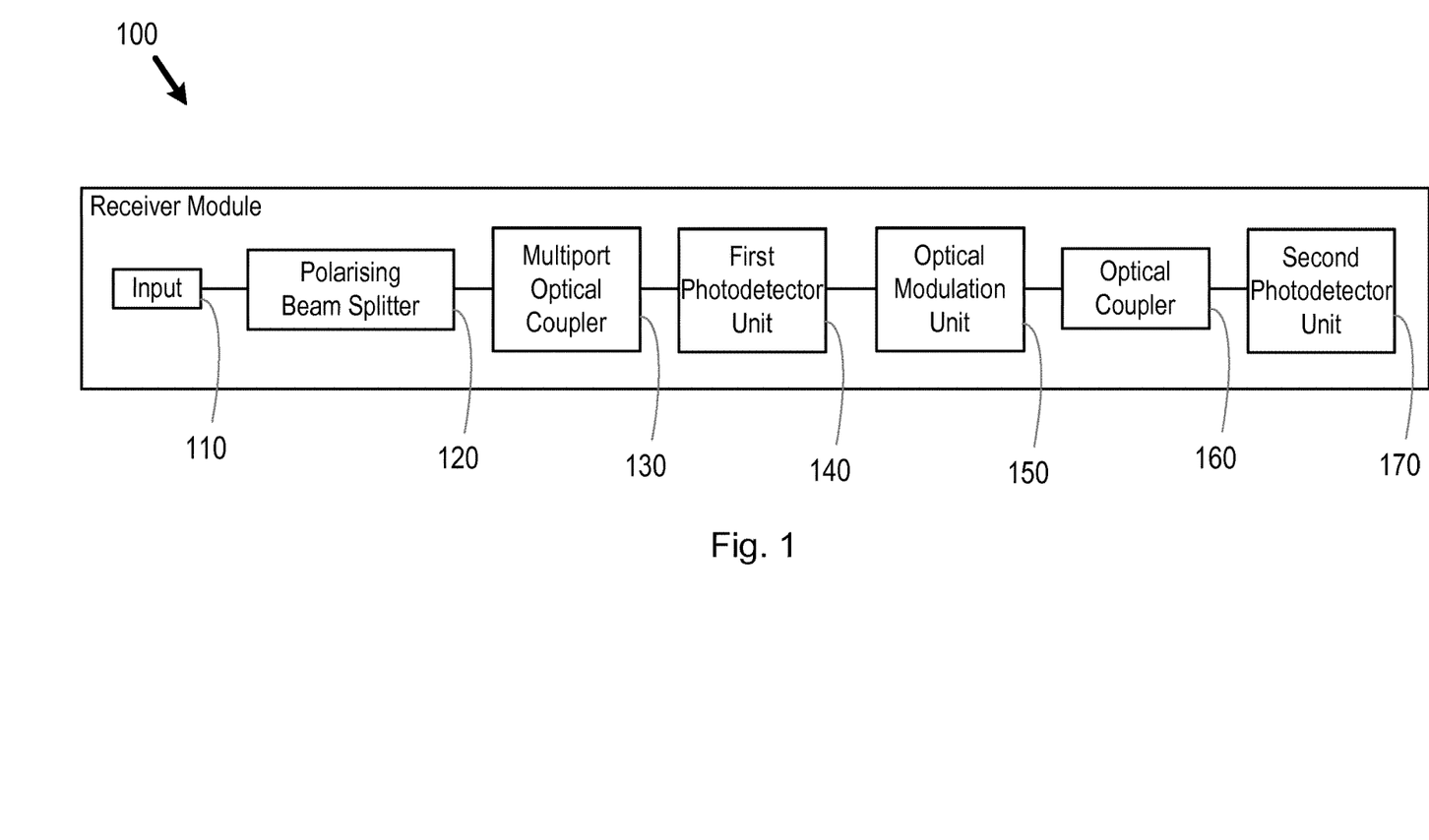
FIG. 1 is a block diagram illustrating functional units in a receiver module.

FIG. 1 is a block diagram illustrating a receiver module 100 which may be used for receiving an optical input signal and generating an electrical output signal from the optical input signal. In optical transmission systems, a data carrying electrical signal is used to modulate an optical transmission signal, and the modulated optical transmission signal is then transmitted over an optical transmission medium (e.g. optical network) for reception by a receiver. A transmitted optical signal may be input to the receiver module 100, which recovers the data from the electrical signal used to modulate the optical transmission signal. The data is recovered in the form of an electrical output signal which is generated from the optical input signal, as discussed below.

Receiver module 100 comprises an input 110 for receiving an optical input signal, and a polarizing beam splitter 120 for splitting one of the optical input signal and a local recovery optical signal. In some examples, the polarizing beam splitter 120 may split the optical input signal. In other examples, the polarizing beam splitter 120 may split the local recovery optical signal (i.e. a local oscillator signal). In examples, one or other of the optical input signal or local recovery optical signal is split by the polarizing beam splitter 120 into different polarizations. The local recovery optical signal is used in the receiver module 100 to recover the data transmitted by the input optical signal. The local recovery optical signal may be provided by a Local Oscillator, and may therefore be referred to as a LO signal in some of the following described examples. There is a frequency separation (Δv) between the local recovery signal and the optical input signal. The frequency separation Δv may in some examples be greater than a threshold value. In one example the threshold value may be equal to the bandwidth of the optical input signal. This frequency difference ensures that unwanted components in the output signal (of amplitude dependent upon input optical signal State of Polarization and translated from the correct signal component by 2Δv) can be filtered out, so achieving insensitivity to polarization of the input optical signal.

Receiver module 100 further comprises a multiport optical coupler 130 for coupling the outputs of the polarizing beam splitter and the other of the optical input signal and local recovery optical signal, and outputting a plurality of optical outputs. If the polarizing beam splitter splits the optical input signal, then the multiport coupler couples the two different polarizations of the optical input signal, output from the polarizing beam splitter, with the local recovery optical signal. If the polarizing beam splitter splits the local recovery optical signal, then the multiport coupler couples the two different polarizations of the local recovery optical signal, output from the polarizing beam splitter, with the input optical signal.

The multiport optical coupler 130 comprises an optical coupler having a plurality of optical input ports and a plurality of optical output ports. The number of input ports is equal to 3: two ports for the two outputs from the polarizing beam splitter and one port for the local recovery optical signal or for the input optical signal, depending upon which of these signals has been input to the polarizing beam splitter. If the optical input signal has been split by the polarizing beam splitter then the third input for of the multiport coupler is for the local recovery optical signal. If the local recovery optical signal has been split by the polarizing beam splitter then the third input port of the multiport coupler is for the optical input signal. The number of output ports of the multiport coupler may be equal to any number k that is greater than 1. The multiport optical coupler may in some examples comprise a 3×3 coupler.

The multiport coupler outputs a plurality of optical signals, one from each output port. Each optical signal output from the multiport coupler comprises a superimposed combination of the input signals. Each of the optical signals output from the multiport coupler is phase shifted with respect to the other optical signals output by the multiport coupler. The phase shift is 360°/number of output ports. In the example of a 3×3 coupler, the phase shift is 120°. The output signals from a 3×3 coupler may be obtained from the expressions describing the behavior of a 3×3 coupler.

The receiver module 100 also comprises first photodetector unit 140 for individually photodetecting the outputs of the multiport optical coupler 130. The first photodetector unit 140 may comprise a plurality of photodetecting elements, each photodetecting element arranged to photodetect a respective output from the multiport optical coupler 130.

The receiver module 100 further comprises an optical modulation unit 150 for using each of the photodetected outputs to modulate a respective local conversion optical signal. Modulation of the local conversion optical signals with the photodetected outputs of the first photodetector unit 140 has the effect of converting the photocurrent signals from the electrical domain back into the optical domain. Data from the photodetected outputs of the first photodetector unit is added, by optical amplitude modulation, to the local conversion optical signals. Each local conversion optical signal has a different frequency from the other local conversion optical signals, and a frequency difference between each local conversion optical signal may in some examples be greater than a bandwidth of a photodetector of a second photodetector unit 170. One of the local conversion optical signals may comprise, or be formed from, the local recovery optical signal. For example, one of the local conversion optical signal may have a common source with the local recovery optical signal. For example, a light source may be split such that a part of its optical power is used as the local recovery optical signal, and a further part is used as (one or more) local conversion optical signal(s). The local conversion optical signals are optical wavelengths, e.g. optical carriers, provided for the purpose of being modulated with the data carrying signals on the different paths of the receiver module.

This frequency separation between the local conversion optical signals ensures that unwanted contributions from the local conversion optical signals present after coupling of the modulated local conversion optical signals may be filtered out by the action of the second photodetector unit, as discussed in further detail below.

Receiver module 100 also comprises an optical coupler 160 for coupling the modulated local conversion optical signals to generate an optical output signal. The receiver module 100 further comprises a second photodetector unit 170 for photodetecting the optical output signal to generate the electrical output signal. The second photodetector unit 170 may comprise an output photodetector, and a frequency separation between each of the local conversion optical signals may be greater than the bandwidth of the output photodetector to ensure filtering of unwanted signal contributions, as discussed above. The first photodetecting unit 140 and the second photodetecting unit 170 may comprise at least one semiconductor photodetector.

Receiver module 100 may also comprise electrical processing capabilities. Receiver module 100 may comprise a first electrical processing unit arranged to filter and electrically amplify each of the photodetected outputs from the first photodetector unit 140. The receiver module 100 may further comprise a second electrical processing unit arranged to filter the photodetected output of the second photodetector unit.

Figure 2:
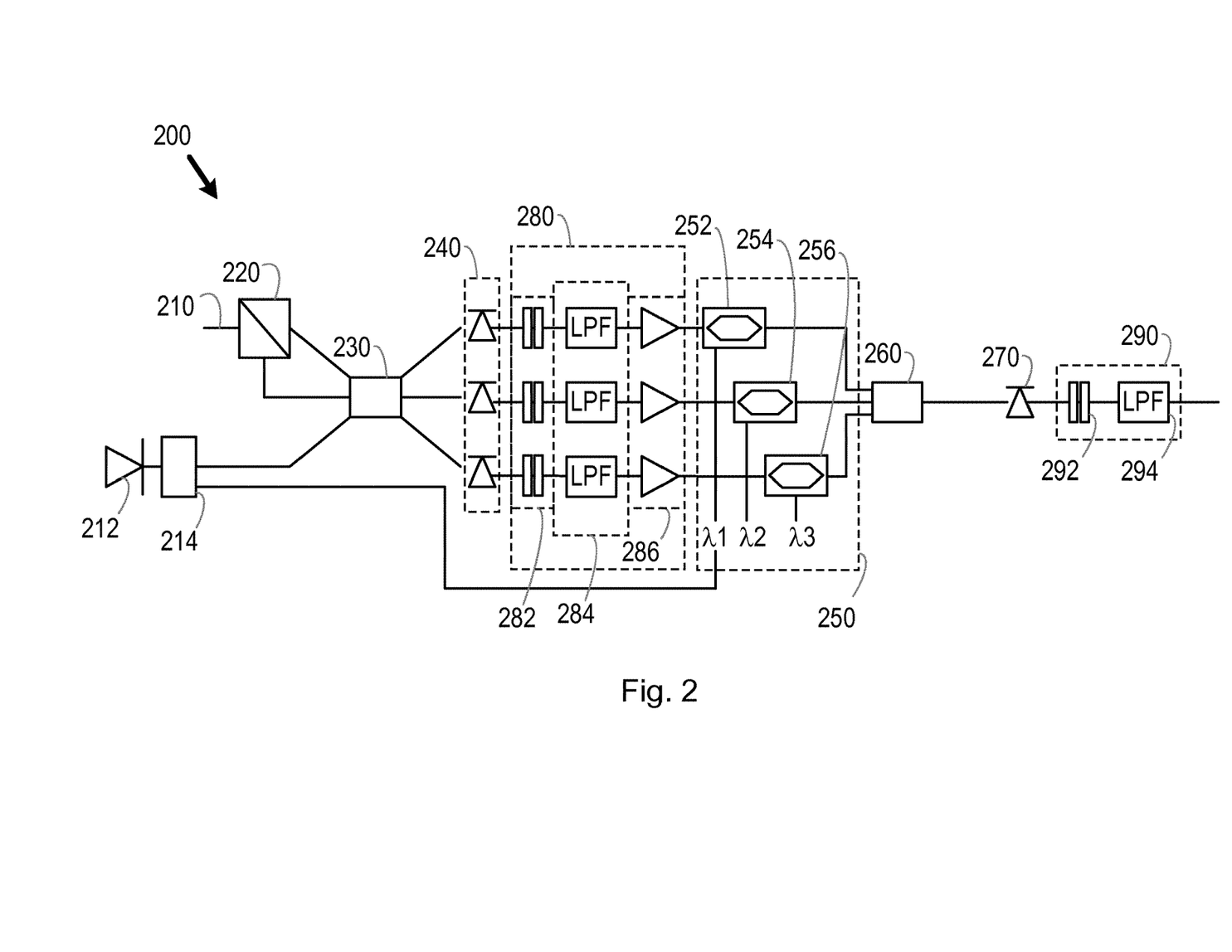
FIG. 2 is a block diagram illustrating functional units in another example of a receiver module.

An example implementation of a receiver module 200 for receiving an optical input signal and generating an electrical output signal from the optical input signal is illustrated in FIG. 2. The receiver module 200 illustrates one way in which the functional blocks of the receiver module 100 may be realised, as well as illustrating additional elements which may provide enhanced or additional functionality.

Referring to FIG. 2, the receiver module 200 comprises an input 210 for receiving an optical input signal. The optical input signal is fed to a polarization beam splitter 220, which splits the input signal into its two orthogonal polarization components. Receiver module 200 also comprises laser 212, which provides a local oscillator signal for the input optical signal. The optical signal provided from laser 212 is effectively used to optically amplify the input optical signal. The optical signal from laser 212 is passed through a beam splitter 214, and one of the branches of the splitter is fed to optical modulation unit 250, which will be described in more detail below. The other branch of the beam splitter 214 is fed to one of the inputs of 3×3 coupler 230, i.e. as the local recovery signal. At the 3×3 coupler 230 the local oscillator signal from laser 213 is mixed with the orthogonally split components of the input optical signal, provided from polarization beam splitter 220. In some examples, the output of the laser 212 may be passed through the polarization beam splitter 220 to be split into two orthogonal components instead of the optical input signal. In this configuration the optical input signal would be fed directly into the 3×3 coupler 230 without any splitting performed on the input optical signal. Either the optical input signal or the local oscillator signal may be split by the polarization beam splitter without departing from the described operation of receiver module 200.

The mixing of the local oscillator signal from laser 212 and the orthogonal components of the optical input signal from polarization beam splitter 220 results in three phase-shifted outputs from the 3×3 coupler 230. The 3×3 coupler 230 is thus used to create 120° phase shifted replicas of a signal that is a product of the input optical signal and the local recovery optical signal, or LO. The 3×3 coupler 230 represents an example of a multiport In some aspects, each port may be considered as an input to a separate path through parts of the receiver 200, as described in more detail below. A 3×3 coupler may be usefully employed in some receiver modules as it comprises a smaller number of ports to reduce receiver module size and complexity. As discussed above, the outputs of the 3×3 coupler are each phase-shifted by 360/k degrees, meaning that in the example of receiver module 200, each branch is phase-shifted by 360/3=120°. Having k=3 may also be advantageous in some examples as k=3 is the smallest value at which the unwanted additional variance term of an optical coherent receiver (discussed above) is eliminated.

Referring still to FIG. 2, the outputs of the 3×3 coupler 230 are individually photodetected by a first photodetector unit 240. First photodetector unit 240 comprises a plurality of photodetectors, e.g. photodiodes, each configured to photodetect a respective output from 3×3 coupler 230. In some aspects, the electrical output from the first photodetector unit 240 is at a frequency which is a difference between the input optical signal and the local recovery optical signal.

The photocurrents produced by the first photodetector unit 240 are passed to a first electrical processing unit 280 where the photocurrents are electrically filtered and amplified. The first electrical processing unit 280 comprises DC blocks 282, low-pass filters (LPFs) 284 and amplifiers 286, and is arranged such that each photocurrent passes through a single a DC block, LPF and amplifier. The photocurrents from the first photodetector unit 240 are filtered and then amplified by the first electrical processing unit 280, and the outputs of this unit are supplied to an optical modulation unit 250. The electrical outputs from the photodetectors includes the phase shifts introduced by the 3×3 coupler.

Optical modulation unit 250 comprises optical modulators 252, 254 and 256. Each optical modulator is provided with a respective local conversion optical signal $\lambda 1$, $\lambda 2$ and $\lambda 3$. Each local conversion optical signal $\lambda 1$, $\lambda 2$, $\lambda 3$, has a different frequency from the other local conversion optical signals of that optical modulation unit 250. A frequency difference between each local conversion optical signal may in some examples be greater than a bandwidth of a photodetector of a second photodetector unit 270 described below.

The frequency difference between the local conversion optical signals ensures that unwanted contributions from the local conversion optical signals that appear in the optical output signal discussed below are filtered by the photodetector of the photodetector unit 270. The local conversion optical signals $\lambda 1$, $\lambda 2$, $\lambda 3$, may each be provided from a respective laser. In the receiver module 200, one of the local conversion optical signals, $\lambda 1$, is provided from the laser 212 which also provides the local oscillator signal. The filtered and amplified photocurrents supplied to the optical modulation unit 250 modulate the local conversion optical signals supplied to the optical modulators 252, 254 and 256. The optical modulation unit 250 thus converts the photocurrent signals from the electrical domain back into the optical domain. The modulated local conversion optical signals from optical modulation unit 250 are supplied to an optical coupler 260, e.g. 3×1 optical coupler, in which the modulated local conversion optical signals are coupled, i.e. combined, to generate an optical output signal.

This optical output signal is photodetected by a second photodetector unit 270, which generates an electrical output signal. Photodetector unit 270 may comprise a single photodetector, e.g. photodiode. As discussed above, unwanted contributions from the local conversion optical signals that appear in the optical output signal discussed below are filtered by the photodetector of the photodetector unit 270. The photodetector unit 270 is configured to receive an optical frequency modulated by an electrical data signal, e.g. λ1 modulated at modulator 252, and output a signal corresponding to the modulating electrical data signal in its electrical output. The photodetector unit 240 does so for each path through the first electrical processing unit 280 and optical modulation unit 250.

The characteristics of the photodetector and the received optical signals provide for a combining of the plurality of paths (e.g. three paths) of the first electrical processing unit 280 and optical modulation unit 250 into a single electrical signal including the received data signal present in the received optical input. In some aspects, the phase shifts introduced by the 3×3 coupler 230 allow for the photodetector to combine the separate paths without introducing unwanted combinations of signals. As such, the optical modulation unit 250 and photodetector 270 provide for an optical amplification and combining of the optical signal produced from the heterodyning with the local oscillator, i.e. as provided by the coupler 230 and photodetector 240. This allows high frequency (i.e. high capacity) data signals to be effectively received, e.g. above 10 Gbit/s.

The electrical output signal is then passed to a second electrical processing unit 290, which comprises DC block 292 and LPF 294 to filter the electrical output signal before the electrical output signal is output by the receiver module, for example to be processed by further components.

Receiver module 200 illustrates an example of a receiver module that can receive an optical input signal and generate an electrical output signal from the optical input signal. Receiver module 200 advantageously provides a receiver that is capable of recovering and accommodating high speed signals with a bitrate greater than 10 Gbit/s. As noted above, the receiver schematic described in the background section comprises electrical squaring and summing components that cannot accommodate high speed signals due to the bandwidth limitations of these components. For example, an electrical square module element is not currently commercially available at bandwidths higher than 20 GHz. However, in the receiver module 200, the squaring and adding functions are performed in the optical domain.

The optical modulation unit 280 converts the photocurrents back to optically modulated signals and these signals are coupled at the 3×1 coupler 260. This module effectively performs the summing function. The combined optical output signal from the 3×1 coupler 260 is then photodetected by second photodetector unit 270. The photocurrent generated by a photodiode is proportional to the square of the received optical signal.

Thus, the electrical output signal produced by the second photodetector unit 270 is proportional to the square of the optical output signal provided from the 3×1 coupler. As such, the summation and squaring functions performed with high frequency RF electronic circuitry in receiver schematic described in the background section are performed in the optical domain according to the receiver module of FIG. 2. The optical components can easily be designed to accommodate the bandwidth requirements associated with high speed signals with a bitrate greater than 10 Gbit/s. As such, a receiver module according to the present disclosure is able to generate an electrical output signal from a high speed optical input signal.

In order for the receiver module 200 to generate an electrical output signal as described above, each of the local conversion optical signals should have a different frequency from the other local conversion optical signals. The frequency separation between each of the local conversion optical signals may generally be greater than the bandwidth of the detector of the second photodetector unit 270. This is to ensure that unwanted double product components, produced when the optical output signal is photodetected (due to the squaring relationship), fall outside of the bandwidth of the second photodetector unit 270. This effectively eliminates these unwanted components from the photodetected electrical output signal, so only the received signal information is recovered and processed.

A plurality of receiver modules such as those described above with reference to FIGS. 1 and 2 may in some examples of the present disclosure be combined to form a multichannel receiver.

Figure 3:
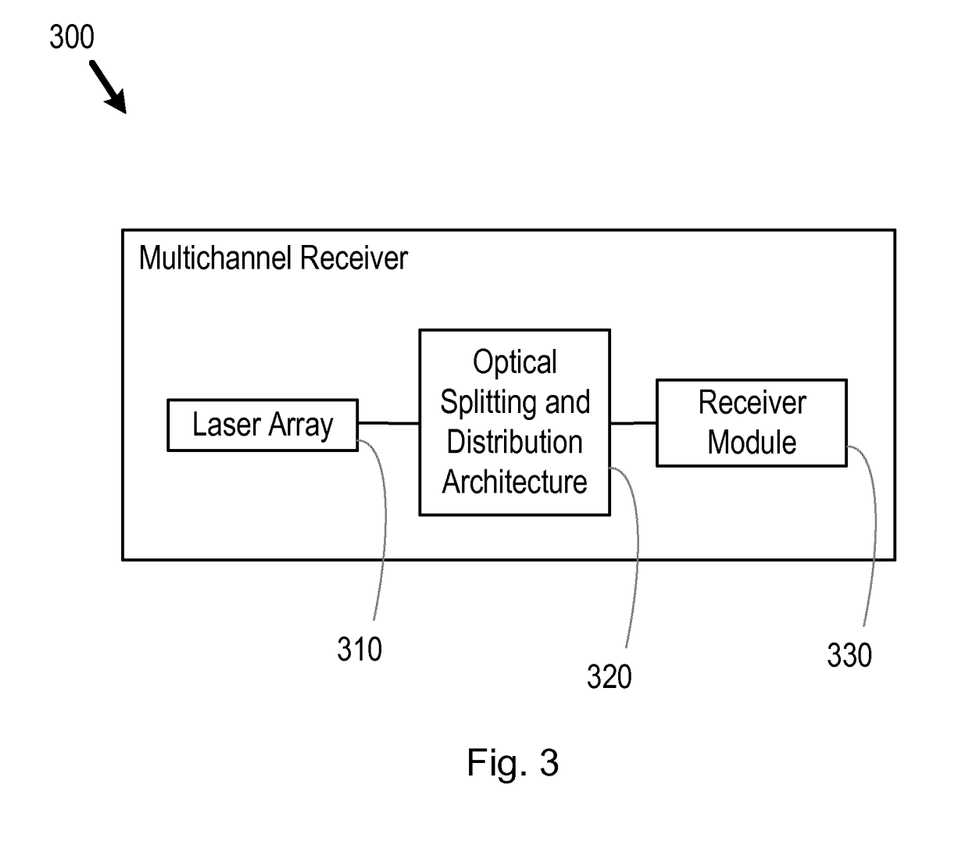
FIG. 3 is a block diagram illustrating functional units in a multichannel receiver.

FIG. 3 is block diagram illustrating functional units in a multichannel receiver 300, which may be used for receiving N optical input signals and generating N electrical output signals from the N optical input signals. The multichannel receiver 300 comprises a receiver module 330 for each of the N optical input signals. The receiver module 330 may comprise the same functional units as comprised in either receiver module 100 or receiver module 200 or receiver modules 430*a*, 430*b*, 430*c* as described below.

The multichannel receiver 300 also comprises a laser array 310. The laser array 310 comprises N lasers for generating N local recovery optical signals of different frequencies; a local recovery optical signal of a different frequency for each of the N receiver modules. In one example, the value of N may be not less than 3, for example the value of N may be 3 or more. The multichannel receiver 300 further comprises an optical splitting and distribution architecture 320 for dividing a set of the local recovery optical signals generated by the laser array 310, and distributing the divided optical signals between optical modulation units of the receiver modules to provide the local conversion optical signals for all of the receiver modules. The optical splitting and distribution architecture 320 may in some examples comprise three optical splitters, each optical splitter arranged to divide a local recovery optical signal generated by a respective laser of the laser array 310. The components of the multichannel receiver may be arranged in a Photonic Integrated Circuit (PIC) and/or an Electronic Integrated Circuit (EIC). The PIC and the EIC may be arranged on a single chip.

Figure 4:
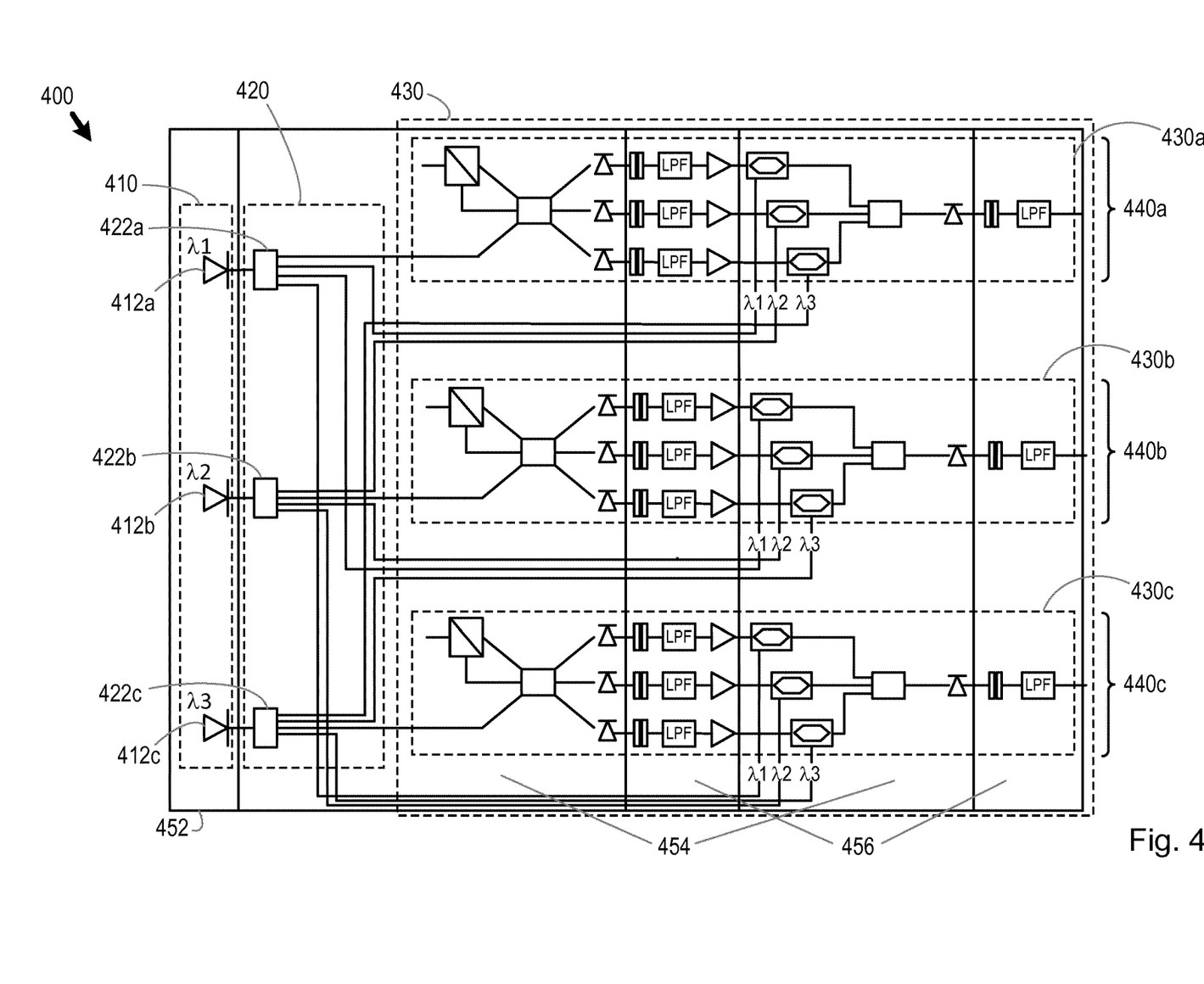
FIG. 4 is a block diagram illustrating functional units in another example of a multichannel receiver.

An example implementation of a multichannel receiver 400 for receiving N optical input signals and generating N electrical output signals from the N optical input signals is illustrated in FIG. 4. The multichannel receiver 400 illustrates one way in which the functional blocks of the multichannel receiver 300 may be realized, as well as illustrating additional elements which may provide enhanced or additional functionality.

Referring to FIG. 4, the multichannel receiver 400 may be used for receiving N optical input signals and generating N electrical output signals from the N optical input signals. The multichannel receiver 400 illustrated in FIG. 4 is configured to generate N=3 electrical output signals from N=3 optical input signals. However, the multichannel receiver 400 may be configured with N equal to any integer, configured to generate any number of electrical output signals from a corresponding number of optical input signals. In some examples, it may be desirable for the number N to be not less than 3, such that the three lasers of the laser array may provide the three different local conversion optical signals for each of the receiver modules, as is discussed in further detail below. With N=3 as illustrated in FIG. 4, the multichannel receiver comprises three channels: a first channel 440$a$, a second channel 440$b$ and a third channel 440$c$. Each channel is configured to generate an electrical output signal from a respective received optical input signal.

Multichannel receiver 400 comprises receiver module unit 430. Comprised within receiver module unit 430 are first, second and third receiver modules 430$a$, 430$b$ and 430$c$, respectively. Each receiver module 430$a$-$c$, generates an electrical signal from an optical signal on a respective channel 440$a$-$c$. Receiver modules 430$a$-$c$, each comprise the same functional units as receiver module 100 and/or 200 and operate in the same way as receiver module 100 and/or 200 to generate (i.e. recover) an electrical output signal from a respective input optical signal. As such, the examples for the receiver module of any embodiment are applicable to the receiver 400 comprising a plurality of receiver modules and receiving a plurality of input optical signals. In the illustrated example of FIG. 4, receiver modules 430$a$-$c$ each comprise the additional elements of receiver module 200 and may each operate in the same way as receiver module 200 to generate an electrical output signal from a respective optical input signal.

Multichannel receiver 400 also comprises laser array 410 and optical splitting and distribution architecture 420. The laser array 410 comprises three lasers: a first laser 412$a$, a second laser 412$b$ and a third laser 412$c$. The lasers 412$a$-$c$ are configured to provide the local recovery optical signals for a plurality, or each, of the receiver modules 430$a$-$c$. The lasers 412$a$-$c$ also provide the local conversion optical signals for a plurality, or all, of the optical modulation units of the receiver module 430 via the optical splitting and distribution architecture 420. The optical signals provided from laser array 410 are split and distributed to the optical modulation units of the receiver modules by optical splitting and distribution architecture 420. The optical splitting and distribution architecture 420 comprises three beam splitters: a first beam splitter 422$a$, a second beam splitter 422$b$ and a third beam splitter 422$c$. First, second and third beam splitters 422$a$-$c$ are configured to split first, second and third lasers 412$a$-$c$, respectively. As such, the laser array provides both optical local oscillators and a plurality of local conversion optical signals for optically recovering the received data signal. As described, a plurality of local conversion optical signals at different frequencies are required to be modulated, in order to optically recover the input signal. The optical splitting and distribution architecture 420 further comprises waveguides to distribute the optical signals to their required locations throughout receiver module 430 as described below.

Each optical signal from a respective laser provides the local recovery optical signal for a respective receiver module unit and also provides a local conversion optical signal for one of the optical modulators of the optical modulation unit for each receiver module 430$a$-$c$. For example, laser 412$a$ outputs light of a wavelength $\lambda 1$. This optical signal is split by beam splitter 422$a$, which comprises a 1×4 splitter. One of the outputs of the splitter 422$a$ is provided to first receiver module 430$a$ as the local recovery optical signal, to be mixed with the optical input signal, received at the input of first receiver module 430$a$.

The remaining three outputs from first beam splitter 422$a$ are fed to an optical modulator of each receiver module 430$a$-$c$, denoted by the $\lambda 1$ supplied to an optical modulator for each receiver module 430$a$-$c$. These signals provided to each of the optical modulators therefore provide one of the local conversion optical signals for each optical modulation unit. The local conversion optical signal is modulated by the photocurrent produced on one branch of each receiver module unit 430$a$-$c$. A similar architecture is provided for lasers 412$b$ and 412$c$ by beam splitters 422$b$ and 422$c$, respectively.

Laser 412$b$ outputs an optical signal with a wavelength $\lambda 2$ and is split by beam splitter 422$b$. One output of splitter 422$b$ is provided as the local recovery optical signal for receiver module 430$b$. The other three outputs of the beam splitter 422$b$ are provided to optical modulators of each of the receiver modules 430$a$-$c$ as a local conversion optical signal, denoted by the $\lambda 2$ supplied to an optical modulator of each receiver module 430$a$-$c$. Laser 412$c$ outputs an optical signal with a wavelength $\lambda 3$ and is split by beam splitter 422$c$. One output of splitter 422$b$ is provided as the local recovery optical signal for receiver module unit 430$c$. The other three outputs of the beam splitter 422$c$ are provided to optical modulators of each of the receiver modules 430$a$-$c$ as a local conversion optical signal, denoted by the $\lambda 3$ supplied to an optical modulator for each receiver module 430$a$-$c$.

The architecture of multichannel receiver 400 thus ensures that local conversion optical signals of different frequency are provided to the optical modulators on each branch of each receiver module 430$a$-$c$. In some aspects, the same frequency local conversion optical signal is used on a plurality of the receiver modules 430$a$, 430$b$, 430$c$. As described above, this may be achieved by splitting a common source of the local conversion optical signal, e.g. by using the beam splitter 422$a$, 422$b$, 422$c$. As discussed above, the frequency difference between the local conversion optical signals ensures than unwanted contributions from these signals may be filtered out by photodetectors of the receiver modules 430$a$-$c$. In other words, unwanted frequencies from the mixing provided by the photodetectors are not included in the output. The frequency separation between each local conversion optical signal may generally be greater than the bandwidth of the second photodetector unit of each of each receiver module 430$a$-$c$, as described above in relation to receiver module 200. Each receiver module 430$a$-$c$ thus generates an electrical output signal from a respective optical input signal on its channel 440$a$-$c$ of multichannel receiver module 400.

Multichannel receiver 400 may be configured with any number of channels. However, multichannel receiver 400 may be advantageously configured with the number of channels equal to or greater than 3. A requirement of each receiver module unit 430$a$-$c$ is that each local conversion optical signal supplied to the optical modulators of each unit has a different frequency than the other local conversion optical signals. To fulfil this condition, in a three channel receiver, three different lasers 412$a$-$c$ outputting optical signals with three different wavelengths $\lambda 1$, $\lambda 2$ and $\lambda 3$ may be employed. These different optical signals may advantageously be used as the local recovery signals for each of the respective channels 440$a$-$c$, of the multichannel receiver 400.

Thus, with the architecture of multichannel receiver 400, N lasers are required for N channels, where N may take any integer value greater than 3. This is in contrast to the architecture of receiver module 200, for example, where three lasers may be required to generate a single electrical output signal from an optical input signal, meaning that for N channels, 3N lasers would be required. Lasers are one of the more expensive optical components, and so reducing the number of lasers used to generate an electrical output signal from each input optical signal, such as with the architecture of multichannel receiver 400, may provide significant cost saving.

A multichannel receiver having the architecture of the receiver 400 of FIG. 4, and a number of channels greater than three, would also provide significant cost savings. In such an example receiver, each channel may be associated with a respective laser to provide the local recovery optical signal for the channel. A subset comprising a minimum of three lasers from the total number of lasers provided in the architecture of the multichannel receiver may be used to supply the local conversion optical signals for the optical modulators of the individual receiver modules, via a suitable optical splitting and distribution architecture. In some examples, the splitting and distribution architecture may be such that the same three lasers provide the local conversion optical signals for all channels, that is for the optical modulation units of all of the receiver modules in the multichannel receiver.

In other examples, the subset of lasers providing local conversion signals may comprise a number greater than three. In such examples, the splitting and distribution architecture may be such that signals from a plurality of four or more lasers are shared between the channels of the multichannel receiver, such that each optical modulation unit receives three local conversion optical signals having a suitable frequency separation (greater than a bandwidth of the output photodetector, as discussed above), with each optical modulation unit not necessarily receiving the same three local conversion optical signals. Such an arrangement may be desirable in a multichannel receiver having a large number of channels, in which the optical splitting and distribution architecture may be simplified by using the lasers closest to a particular channel to supply the local conversion optical signals for that channel.

In an example multichannel receiver having four channels, four lasers would be provided in the laser array of the multichannel receiver to provide a respective local recovery signal for each channel. A subset of three lasers from the four lasers may be split and distributed appropriately by the optical splitting and distribution architecture to provide the local conversion optical signals for the receiver modules. In an example multichannel receiver having six channels, and hence a laser array of six lasers, it may be desirable to provide the local conversion optical signals using a larger subset of lasers. Thus for example, lasers 1, 2 and 3 may provide the local conversion optical signals for channels 1 to 3, and lasers 4, 5 and 6 may provide the local conversion optical signals for channels 4 to 6. It will be appreciated that other configurations may be envisaged according to the particular requirements of any given multichannel receiver.

Multichannel receiver 400, and more generally any N channel multichannel receiver having the architecture of multichannel receiver 400, may be implemented on a single chip module using notably silicon photonics for the realisation of the optical components. As illustrated in FIG. 4, multichannel receiver 400 comprises laser array 452, photonic integrated circuit (PIC) 454 and electronic integrated circuit (EIC) 456. The integrated circuits 454, 456 and laser array 452 may be realised on a single chip to form multichannel receiver 400. Laser array 452 comprises the lasers 412*a-c*. PIC 454 comprises the optical components of multichannel receiver 400 including optical splitting and distribution architecture 420 and the optical couplers, photodetectors, polarisation beam splitters and optical modulators of the receiver modules 430*a-c*. EIC 456 comprises electrical components including the DC blocks, LPFs and amplifiers of the receiver modules 430*a-c*. Implementing the components of receiver module 430 using integrated techniques provides cost and manufacturing advantages.

Figure 5:
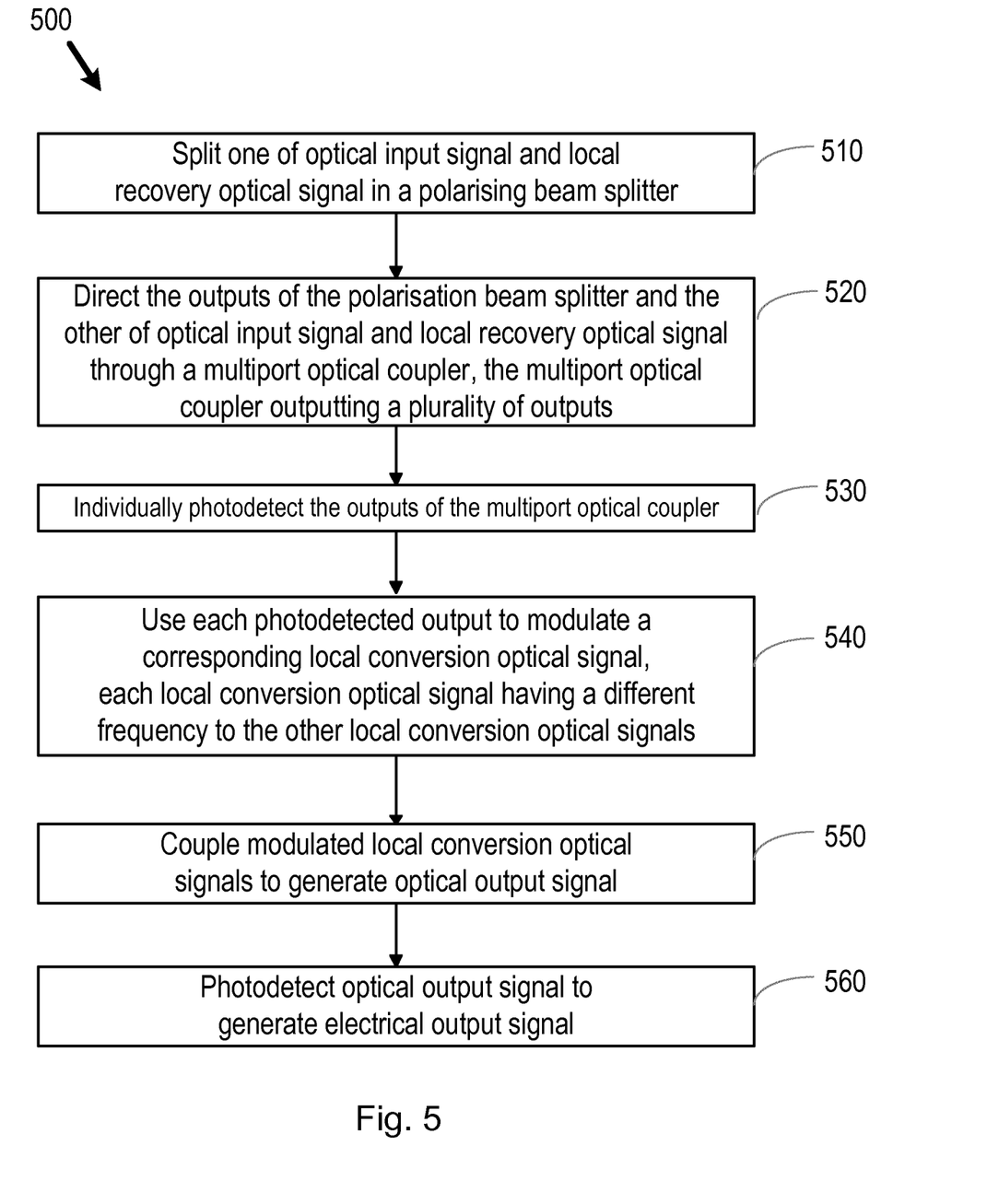
FIG. 5 is a flow chart illustrating process steps in a method for receiving an optical input signal and generating an electrical output signal from the optical input signal.

FIG. 5 is a flow chart illustrating process steps in an example of a method 500 for receiving an optical input signal and generating an electrical output signal from the optical input signal. The method may be carried out by a receiver module. In some examples, the method may be carried out by receiver module 100 or receiver module 200. Referring to FIG. 5, in a first step 510, the method comprises splitting one of an optical input signal and a local recovery optical signal in a polarising beam splitter. Either the optical input signal or local recovery signal may be split by the polarising beam splitter, without departing from the scope of method 500. The method then comprises, in step 520, directing the outputs of the polarisation beam splitter and the other of the optical input signal and local recovery optical signal through a multiport optical coupler, the multiport optical coupler outputting a plurality of outputs.

The method then comprises, in step 530, individually photodetecting outputs of the multiport optical coupler, and, in step 540, using each of the photodetected outputs to modulate a corresponding local conversion optical signal, each local conversion optical signal having a different frequency to the other local conversion optical signals. The method further comprises, in step 550, coupling the modulated local conversion optical signals to generate an optical output signal and, in step 560, photodetecting the optical output signal to generate the electrical output signal.

Figure 6:
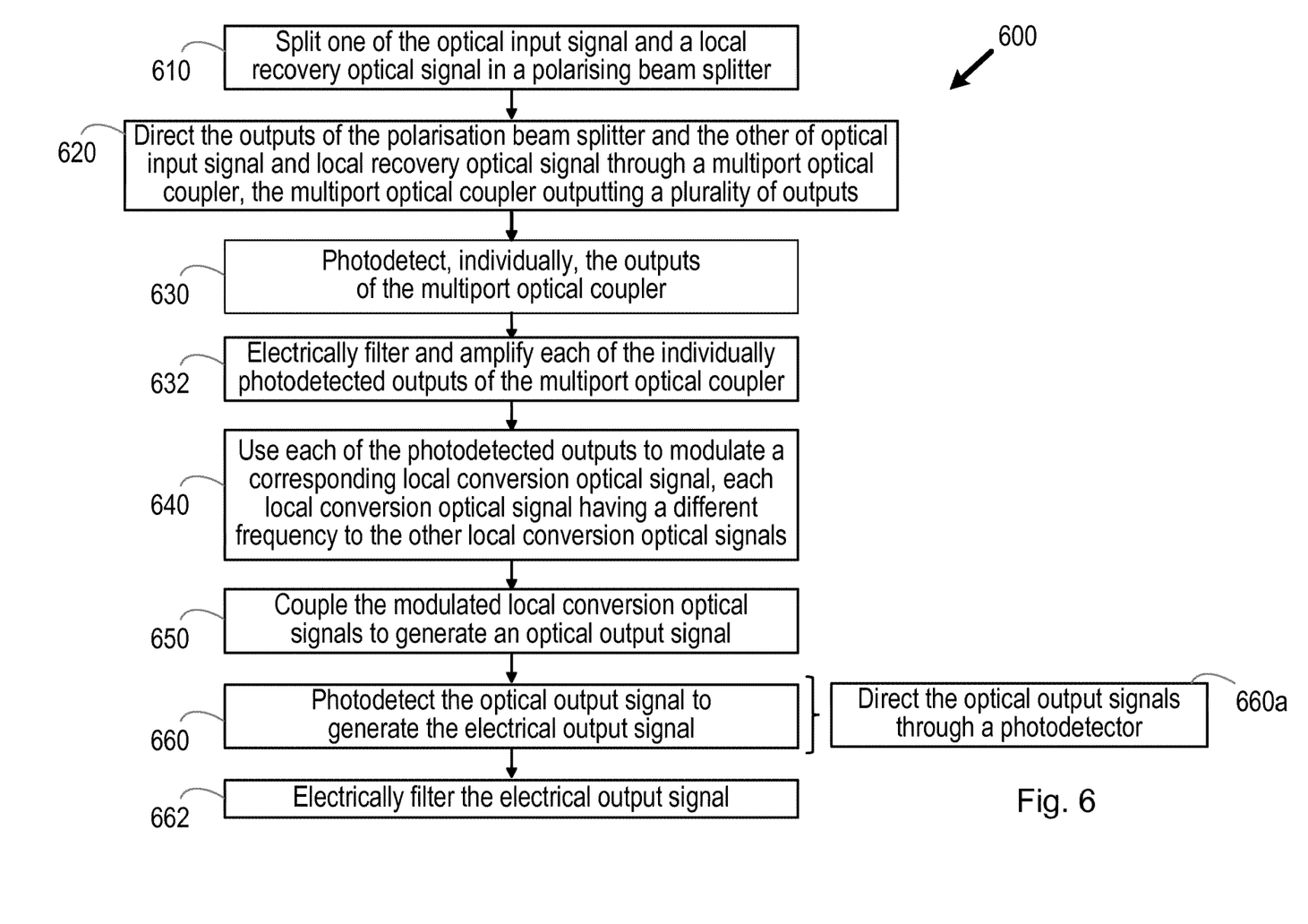
FIG. 6 is a flow chart illustrating process steps in another example of a method for receiving an optical input signal and generating an electrical output signal from the optical input signal.

FIG. 6 is a flow chart illustrating process steps in another example of a method 600 for receiving an optical input signal and generating an electrical output signal from the optical input signal. The method 600 illustrates one way in which the steps of the method 500 may be implemented and supplemented to provide the above discussed and additional functionality. The method may be carried out by a receiver module such as receiver module 100 or receiver module 200. In a first step 610, the method comprises splitting one of an optical input signal and a local recovery optical signal in a polarising beam splitter. In some examples, the frequency separation between the optical input signal and the local recovery signal is greater than a threshold value, which may be the bandwidth of the optical input signal.

The method 600 then comprises, in step 620, directing the outputs of the polarisation beam splitter and the other of the optical input signal and local recovery optical signal through a multiport optical coupler, the multiport optical coupler outputting a plurality of outputs. The multiport optical coupler may comprise a 3×3 optical coupler. The method 600 then comprises, in step 630, individually photodetecting outputs of the multiport optical coupler. The method then comprises, in step 632, electrically filtering and amplifying each of the individually photodetected outputs of the multiport optical coupler. The method further comprises in step 640, using each of the photodetected outputs to modulate a corresponding local conversion optical signal, each local conversion optical signal having a different frequency to the other local conversion optical signals used for that particular optical input signal. In some examples, one of the local conversion optical signals may comprise the local recovery optical signal. The method then comprises, in step 650, coupling the modulated local conversion optical signals to generate an optical output signal, and, in step 660, photo-detecting the optical output signal to generate the electrical output signal. The method comprises, in step 660a, directing the optical output signal through a photodetector. In some examples, the frequency separation between each of the local conversion optical signals is greater than a bandwidth of the photodetector. The method further comprises, in step 662, electrically filtering the electrical output signal.

Figure 7:
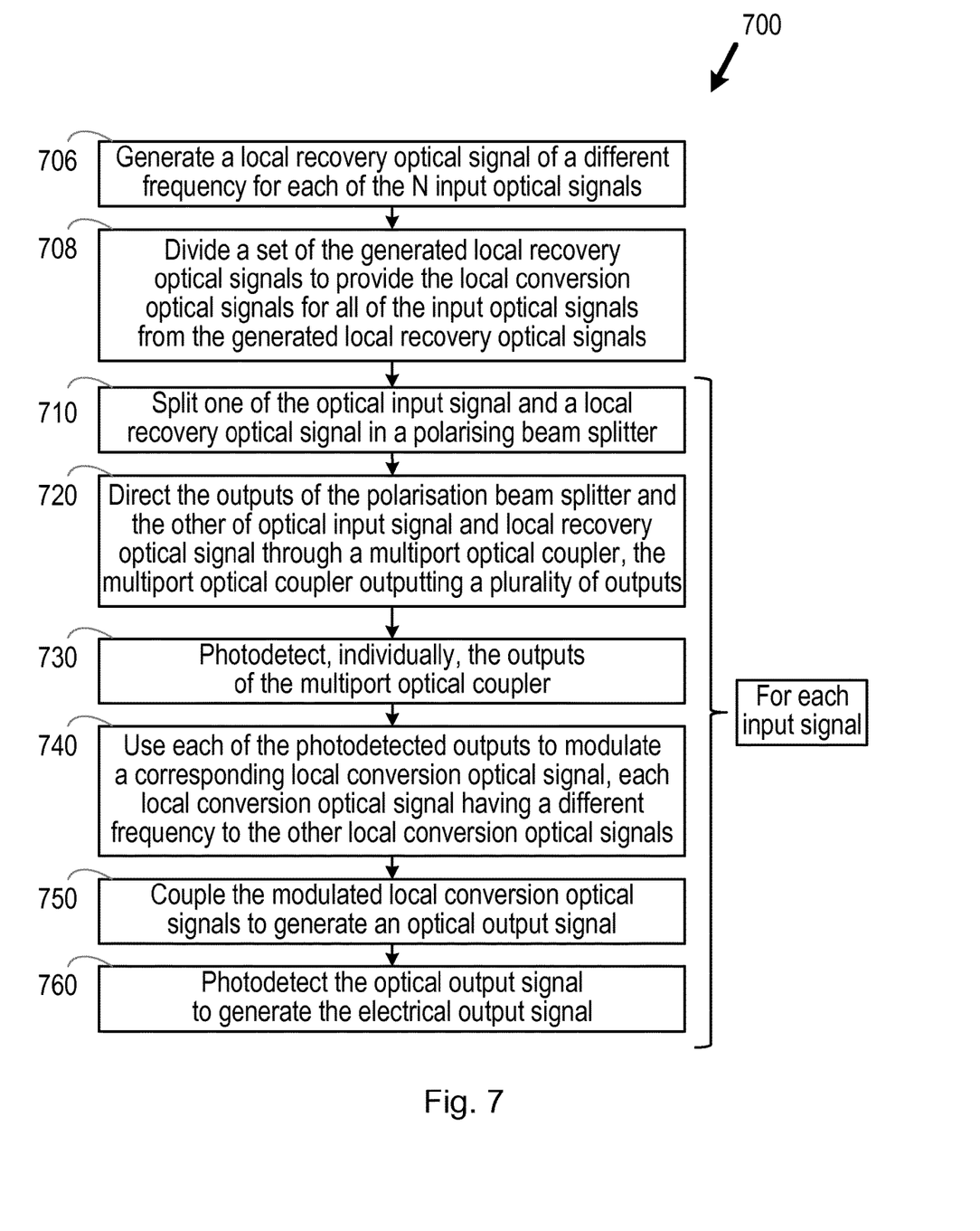
FIG. 7 is a flow chart illustrating process steps in a method for receiving N optical input signals and generating N output electrical signals from the N optical input signals.

FIG. 7 is a flow chart illustrating process steps in an example of a method 700 for receiving N optical input signals and generating N output electrical signals from the N input optical signals. In some examples, the value of N may be not less than 3. The method may be carried out by a multichannel receiver. In some examples the method may be carried out by multichannel receiver 300 or multichannel receiver 400. Referring to FIG. 7, the method 700 comprises, in step 706, generating a local recovery optical signal of a different frequency for each of the N input optical signals. The method also comprises, in step 708, dividing a set of the generated local recovery optical signals to provide the local conversion optical signals for all of the input optical signals from the generated local recovery optical signals. The method 700 then comprises performing the steps of 710-760, for each input signal. Steps of 710-760 may be performed on each channel of a multichannel receiver.

For each of the N input optical signals, the method 700 comprises, in step 710, splitting one of an optical input signal and a local recovery optical signal in a polarising beam splitter. The method then comprises, in step 720, directing the outputs of the polarisation beam splitter and the other of the optical input signal and local recovery optical signal through a multiport optical coupler, the multiport optical coupler outputting a plurality of outputs. The method then comprises, in step 730, individually photodetecting outputs of the multiport optical coupler, and, in step 740, using each of the photodetected outputs to modulate a corresponding local conversion optical signal, each local conversion optical signal having a different frequency to the other local conversion optical signals associated with a particular photodetector. The method further comprises, in step 750, coupling the modulated local conversion optical signals to generate an optical output signal, and, in step 760, photodetecting the optical output signal to generate the electrical output signal.

As illustrated by the above discussion, aspects of the present disclosure provide a receiver module and method which may be used for receiving an optical input signal and generating an electrical output signal from the optical input signal. Conventional coherent receivers are in general prohibitively expensive for applications other than large metro-core networks. The alternative receiver schematic discussed in the background section addresses some of these cost issues in avoiding the need for a hybrid coupler and extensive DSP, however it is limited to receiving signals with a maximum bitrate of about 10 Gbit/s, owing to the maximum bandwidth limitations of the non-linear electrical components. Aspects of the present disclosure perform summing and squaring functions, carried out in the electrical domain according to the discussed schematic, in the optical domain. As such, a receiver module according to the present disclosure is capable of receiving and recovering high speed input signals with a bitrate greater than 25 Gbit/s. A receiver module according to the present disclosure may therefore enable a coherent transmission to be used in short reach optical communications where the increased sensitivity of the receiver and the tune-ability of the local oscillator is desirable. A receiver module according to the present disclosure would therefore be compatible with 5G transport networks, in which support for such high speed signals in short reach optical communications may be required. Aspects of the disclosure may provide for an optical receiver in a radio access network, as described for any example. In some aspects, the optical receiver may be configured to receive and output radio data (e.g. digitized radio signals), In some aspects, the optical receiver may be used for between parts of a distributed radio based station, e.g. fronthaul, or for backhaul data.

Aspects of the present disclosure also provide a multi-channel receiver and method which may be used for for receiving N optical input signals and generating N output electrical signals from the N input optical signals. A multichannel receiver according to the present disclosure comprises a receiver module according to the present disclosure. Such a multichannel receiver comprises a receiver module for each channel of the multichannel receiver. The multichannel receiver also comprises a laser array and an optical splitting and distribution architecture. With a multichannel receiver according to the present disclosure only N lasers are required to generate N electrical output signals from N optical input signals, with a minimum of N=3. Each of the N lasers provides a LO signal for a channel of the receiver and may be shared between the optical modulators of the each receiver modules for provision of the local conversion optical signals. Lasers are commonly among the most expensive components of an opto-electrical circuit. Thus, reducing the number of lasers needed to recover each signal provides cost savings.

A multichannel receiver according to the present disclosure may advantageously be assembled using integrated circuit technology. The optoelectronic circuit of the multi-channel receiver comprises electrical components, which may be assembled on an EIC. The multichannel receiver also comprises multiple optical components that may be assembled using silicon photonics on a PIC. Photonic integrated devices are capable of offering the low cost, high capacity, miniaturization, and low power consumption that are required to support new applications in 5G transport, access networks and data centres. Silicon photonics offers integration with control electronics, high miniaturization, mass reproducibility and high yield. Silicon photonics also offers low cost, as the well-established Complementary Metal-Oxide-Semiconductor (CMOS) production infrastructure may be used for fabrication. Silicon photonics thus offers the possibility for implementation of large-scale integration chips including thousands of optical and opto-electrical circuits with many different functionalities. Thus, implementing the optical components of the multichannel receiver on a PIC, and the electrical components on an EIC, enables the components of the multichannel receiver to be manufactured and implemented together on a single chip. Manufacturing the multichannel receiver in this way provides high miniaturization, mass reproducibility and high yield.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in

The invention claimed is:

1. A receiver module for receiving an optical input signal and generating an electrical output signal from the optical input signal, the receiver module comprising:
   an input for receiving the optical input signal;
   a polarisation beam splitter configured to split, into multiple outputs, one of the optical input signal and a local recovery optical signal;
   a multiport optical coupler configured to:
      couple the outputs of the polarisation beam splitter and the other of the optical input signal and local recovery optical signal, and
      output a plurality of outputs;
   a first photodetector unit configured to individually photodetect the outputs of the multiport optical coupler to produce respective photodetected outputs;
   an optical modulation unit configured to modulate respective local conversion optical signals with the respective photodetected outputs of the multiport optical coupler, wherein each local conversion optical signal has a different frequency than any other local conversion optical signal;
   an optical coupler configured to couple the modulated local conversion optical signals to generate an optical output signal; and
   a second photodetector unit configured to photodetect the optical output signal to generate the electrical output signal.

2. The receiver module of claim 1, wherein the second photodetector unit comprises an output photodetector having a bandwidth that is less than a frequency separation between the frequencies of the local conversion optical signals.

3. The receiver module of claim 1, wherein a frequency separation between the optical input signal and the local recovery signal is greater than a threshold value.

4. The receiver module of claim 3, wherein the threshold value is equal to a bandwidth of the optical input signal.

5. The receiver module of claim 1, wherein the first photodetector unit comprises a plurality of photodetecting elements, each photodetecting element arranged to photodetect a respective output from the multiport optical coupler.

6. The receiver module of claim 1, further comprising a first electrical processing unit arranged to filter and electrically amplify each of the photodetected outputs of the first photodetector unit.

7. The receiver module of claim 1, further comprising a second electrical processing unit arranged to filter the electrical output signal generated by the second photodetector unit before the electrical output signal is output by the receiver module.

8. The receiver module of claim 1, wherein one of the local conversion optical signals comprises the local recovery optical signal.

9. A multichannel receiver for receiving a plurality (N) of optical input signals and generating N electrical output signals from the N optical input signals, the multichannel receiver comprising:
   N receiver modules of claim 1, each receiver module coupled to a different one of the N optical input signals;
   a laser array comprising N lasers configured to generate N local recovery optical signals having different frequencies corresponding to the N receiver modules; and
   an optical splitting and distribution architecture configured to divide a set of the local recovery optical signals generated by the laser array and to distribute the divided optical signals between optical modulation units to provide the local conversion optical signals for all of the receiver modules.

10. A multichannel receiver as claimed in claim 9, wherein N is greater than or equal to 3.

11. A multichannel receiver as claimed in claim 9, wherein:
   the optical splitting and distribution architecture comprises at least three optical splitters; and
   each optical splitter is configured to divide a local recovery optical signal generated by a respective laser of the laser array.

12. A multichannel receiver as claimed in claim 9, wherein components of the receiver modules are arranged in a Photonic Integrated Circuit (PIC) and an Electronic Integrated Circuit (EIC).

13. A method for receiving an optical input signal and generating an electrical output signal from the optical input signal, the method comprising:
   splitting, into multiple outputs via a polarisation beam splitter, one of the optical input signal and a local recovery optical signal;
   using a multiport optical coupler, coupling the outputs of the polarisation beam splitter and the other of the optical input signal and local recovery optical signal to produce a plurality of outputs;
   individually photodetecting the outputs of the multiport optical coupler to produce respective photodetected outputs;
   optically modulating respective local conversion optical signals with the respective photodetected outputs of the multiport optical coupler, wherein each local conversion optical signal has a different frequency than any other local conversion optical signal;
   coupling the modulated local conversion optical signals to generate an optical output signal; and
   photodetecting the optical output signal to generate the electrical output signal.

14. The method of claim 13, wherein photodetecting the optical output signal comprises directing the optical output signal through a photodetector having a bandwidth that is less than a frequency separation between the frequencies of the local conversion optical signals.

15. The method of claim 13, wherein one of the local conversion optical signals comprises the local recovery optical signal.

16. The method of claim 13, wherein a frequency separation between the optical input signal and the local recovery signal is greater than a threshold value.

17. The method of claim 16, wherein the threshold value is equal to a bandwidth of the optical input signal.

18. The method of claim 13, further comprising electrically filtering and amplifying each of the photodetected outputs.

19. The method of claim 13, further comprising electrically filtering the electrical output signal.

20. A method for receiving a plurality (N) of optical input signals and generating N output electrical signals from the N input optical signals, the method comprising:
   performing operations corresponding to the method of claim 13 on each of the N input optical signals;
   generating N local recovery optical signals having different frequencies corresponding to the N input optical signals; and dividing a set of the generated local recovery optical signals to provide the local conversion optical signals for all of the input optical signals from the generated local recovery optical signals.

* * * * *